United States Patent [19]

Nebelung et al.

[11] Patent Number: 4,654,069
[45] Date of Patent: Mar. 31, 1987

[54] GOB DISTRIBUTOR FOR A GLASSWARE MANUFACTURING MACHINE

[75] Inventors: Hermann H. Nebelung; William Grüninger, both of Zurich; Robert Huber, Wettingen, all of Switzerland

[73] Assignee: Emhart Industries, Inc., Farmington, Conn.

[21] Appl. No.: 790,557

[22] Filed: Oct. 23, 1985

[30] Foreign Application Priority Data

Oct. 27, 1984 [GB] United Kingdom ................. 8427220

[51] Int. Cl.⁴ .............................................. C03B 5/30
[52] U.S. Cl. ........................................ 65/163; 65/225; 65/304
[58] Field of Search ........................ 65/225, 304, 163

[56] References Cited

U.S. PATENT DOCUMENTS 3,775,083  11/1973  Nebelung et al. .................... 65/225
4,557,746  12/1985  Braithwaite et al. ................. 65/163

Primary Examiner—Arthur Kellogg
Attorney, Agent, or Firm—Arthur B. Moore

[57] ABSTRACT

The gob distributor is for a glassware manufacturing machine of the individual section type. A gob-delivering scoop (30) is turned about a vertical axis to align it with gob-delivering guides (51 to 58) so that gobs of molten glass can be delivered to the sections of the machine in a predetermined sequence. The scoop (30) is turned by a fluid pressure-operated motor (80,82). The motor is controlled by a servo-system (100) which operates a valve (90) which controls the supply of fluid under pressure to the fluid pressure-operated motor.

9 Claims, 8 Drawing Figures

Fig_1

GOB DISTRIBUTOR FOR A GLASSWARE MANUFACTURING MACHINE

BACKGROUND OF THE INVENTION

This invention is concerned with a gob distributor for a glassware manufacturing machine of the individual section type.

A glassware manufacturing machine of the individual section type comprises a plurality of independent glass manufacturing units, called "sections", each of which operates to manufacture gobs of molten glass into articles of glassware. The sections of a machine are arranged side-by-side on a common base to receive gobs from a common feeder. A gob distributor is positioned between the feeder and the sections to direct successive gobs received from the feeder to the sections in a predetermined sequence. The sections operate with phase differences between them so that, at any given time, each section is at a different stage of its operation from all the others.

The gob distributor of a machine of the individual section type comprises at least one gob-delivering scoop. There is one scoop for each gob delivered at a time and it is common practice for the feeder to deliver two or more gobs at a time and for the sections to each operate on a like number of gobs at a time. The scoop has an upper end portion arranged to receive gobs from the feeder, curves in a vertical plane, and is turnable about a vertical axis extending through the upper end portion thereof to align a lower end portion of the scoop with gob-delivering guides of the sections. The gob distributor also comprises moving means operable to turn the scoop about its vertical axis to align its lower end portion with the gob guides. Where there is more than one scoop, the moving means turns all the scoops about their respective axis to align the lower end portions of the scoops with respective sets of gob-delivering guides. The gob distributor also comprises control means operable to control the moving means so that the lower end portion of the scoop is moved into alignment with the gob-delivering guides of the sections in the predetermined sequence in timed relationship to the receipt of gobs by the upper end portion of the scoop so that the gobs are delivered to the sections in the predetermined sequence.

In a conventional gob distributor, the moving means comprises a ring-shaped gear through which an upper cylindrical portion of the scoop passes, the gear being mounted to turn about the vertical axis of the scoop and the scoop being mounted on the gear to turn therewith. The moving means also comprises a toothed rack meshed with the gear and movable longitudinally to cause the gear to turn through various angles and an electric motor operable to move the rack longitudinally thereof. The motor operates at a constant speed to rotate a cam which provides the control means of the distributor. The rack has a cam follower mounted thereon which is resiliently urged into contact with the cam. The shape of the cam determines the predetermined sequence and the precise alignments reached by the scoop.

The moving means and the control means of a conventional gob distributor are able to turn the scoop through the angles required with the precision necessary and sufficiently rapidly (as little as 0.15 seconds may be available for each turn). However, the control means is not adjustable in operation. Thus, when the mechanism wears to an extent that it lacks the necessary precision, the whole machine must be shut down for a considerable period to allow cam replacement. Furthermore, should one of the sections become inoperative, it is not possible to re-programme the distributor for less sections operating without replacing the cam. Cam replacement is rarely worthwhile when a section becomes inoperative and the normal procedure is to continue normal operation of the distributor but with an interceptor introduced between the feeder and the scoop to deflect the gobs that would otherwise be delivered to the inoperative section into a cullet chute. This procedure is wasteful in that the energy used to melt the deflected gobs is wasted and, furthermore, this procedure can be criticized on safety grounds as a failure of the interceptor could lead to a gob arriving at the inoperative section where a fitter may be working.

Various suggestions have been made concerning the provision of a gob distributor which can be re-programmed while the machine is in operation so that compensation for wear can be made and so that inoperative sections can be "programmed out". In one of these suggestions, see U.S. Pat. No. 4,357,157, the scoop is mounted on the output shaft of an electrical servo-motor which extends along the vertical axis. The servo-motor can be re-programmed by changing the electrical signals supplied thereto. This suggestion, however, requires the use of a heavy-duty electrical servo-motor, since the entire weight of the scoop is moved by the motor, which is expensive. Furthermore, where there are two or more scoops, a like number of servo-motors is required. In another suggestion, an electrical servo-motor is used to turn a worm which meshes with gears on which the scoops are mounted. This suggestion uses one servo-motor for all the scoops but requires a heavy-duty electrical servo-motor. Furthermore, it is believed that an electrical servo-motor driving a worm or a rack and pinion arrangement would not be able to position scoops sufficiently quickly to allow use of such a distributor with a machine having a large number of sections.

It is an object of the present invention to provide a gob distributor for a glassware manufacturing machine of the individual section type which can be rapidly re-programmed and which does not require the use of a heavy-duty electrical servo-motor.

BRIEF SUMMARY OF THE INVENTION

The invention provides a gob distributor for a glassware manufacturing machine of the individual section type operable to deliver gobs of molten glass to the sections of the machine in a predetermined sequence, the distributor comprising a gob-delivering scoop, the scoop having an upper end portion arranged to receive gobs and being turnable about a vertical axis extending through the upper end portion thereof to align a lower end portion of the scoop with gob-delivering guides of the sections, moving means operable to turn the scoop about its vertical axis to align its lower end portion with the gob-delivering guides, and control means operable to control the moving means so that the lower end portion of the scoop is moved into alignment with the gob-delivering guides of the sections in the predetermined sequence in timed relationship to the receipt of gobs by the upper end portion of the scoop so that gobs are delivered to the sections in the predetermined sequence, wherein the moving means comprises a fluid pressure-operated motor coupled to the scoop so that operation of the motor turns the scoop about its vertical axis, and the control means comprises a servo-system operable to operate a valve which controls the supply of fluid under pressure to the motor in accordance with electrical control signals supplied thereto so that the fluid pressure-operated motor turns the scoop into the required alignments.

In a gob distributor according to the last preceding paragraph, the servo-system does not move the scoop but instead controls the positions to which the scoop is moved by the fluid pressure-operated motor. Thus, a heavy-duty servo-system is not required and the distributor can be re-programmed by changing the control signals thereto.

In a gob distributor in accordance with the invention, the servo-system may comprise the servo-motor coupled to a spool of the valve, the spool having a rest position in which it cuts off the supply of fluid under pressure to the fluid pressure-operated motor so that the motor does not turn the scoop, the spool being displaceable from its rest position by the operation of the servo-motor in one direction to supply fluid to the motor to cause the motor to turn the scoop anti-clockwise or in the opposite direction to supply fluid to the motor to cause the motor to turn the scoop clockwise, operation of the servo-motor being effective to displace the spool, and the fluid pressure-operated motor may be coupled to the spool so that operation of the motor causes the spool to be returned to its rest position. This arrangement gives a convenient and precisely-operating construction in which the operations of the servo-motor cause the fluid pressure-operated motor to operate until it has returned the spool to its rest position.

Conveniently, the servo-motor may be coupled to a spool of the valve which has a rest position in which it shuts off the supply of fluid under pressure to the fluid pressure-operated motor so that the motor does not turn the scoop, the spool being displaceable from its rest position by the operation of the servo-motor in one direction to supply fluid to the motor to cause the motor to turn the scoop clockwise or in the opposite direction to supply fluid to the motor to cause the motor to turn the scoop anti-clockwise, and the fluid pressure-operated motor is coupled to the spool so that operation of the motor causes the spool to be returned to its rest position. The fluid-pressure operated motor may be a piston and cylinder assembly having a piston rod coupled to the scoop, the piston of the assembly having a screw-threaded connection with a spindle extending within the cylinder such that movement of the piston causes the spindle to turn, the spindle being connected to the spool so that turning the spindle causes movement of the spool. Furthermore, the servo-motor may be operable to turn a shaft which is connected to the spool so that turning the shaft causes movement of the spool, the shaft having a screw-threaded connection with a bush which is held against longitudinal movement so that turning the shaft causes longitudinal movement thereof and of the spool, the bush being mounted to turn with the spindle to move the shaft and, therefore, to move the spool towards its rest position. This arrangement allows a compact construction using commercially-available parts. The servo-motor may be coupled to the shaft by a resilient coupling which allows the shaft to move relative to the servo-motor.

The servo-motor may conveniently be an electrical stepper motor or a direct-current electrical motor controlled in accordance with feedback provided by a tachometer.

Alternatively, the servo-system may comprise a servo-valve which is the valve operated by the servo system, and a feedback device operable to indicate the alignment of the scoop, the servo-valve being operable to cause fluid under pressure to be supplied to the fluid-pressure operated motor until the feedback device indicates that the scoop has reached the required alignment.

If the fluid pressure-operated motor is operable to move a toothed rack longitudinally thereof, the rack being meshed with a ring-shaped gear through which the scoop passes, the gear being mounted to turn about the vertical axis of the scoop and the scoop being mounted on the gear to turn therewith, the scoops, gears and racks used in conventional gob distributors can be utilised.

In order to reduce the lack of precision caused by backlash between the teeth of the rack and the teeth of the gear, the teeth of the rack may be formed partially on a carrier portion thereof which is rigidly fixed to the fluid pressure-operated motor and partially on a backlash-absorbing portion which is movable longitudinally of the carrier portion against the action of a spring.

In the interests of safety, a position feedback device may monitor the movements caused by operation of the fluid pressure-operated motor so that emergency action can be taken in the event that the movements are not as expected. The emergency action may involve shutting down the machine or introducing an interceptor between the feeder and the distributor. Conveniently, where the fluid pressure-operated motor is a piston and cylinder assembly, the position feedback device may be a linear variable differential transformer acting to monitor movements made by a piston rod of the assembly. The position feedback device may be of any other suitable type, e.g. one which utilises the magneto restrictive ultrasonic effect or an incremental encoder. The position feedback device may also provide a reference signal indicating a reference point from which the movements of the scoops can be re-calculated. Alternatively, such a reference signal may be provided by other means, e.g. a proximity sensor may sense a notch or a pin moved with the rack, the signal of the proximity sensor being used as a reference signal when it coincides with a signal provided by an encoder on the shaft of the stepper motor and arranged to generate a short pulse for every revolution of the motor. In either case, the control means is provided with a reference signal indicating a particular position of the scoop from which the control signals necessary for the movements of the scoop can be re-calculated.

Also in the interests of safety, in order to avoid the scoop being aligned with a gob-delivering guide which is temporarily inoperative, the control means may be programmable to align the scoop with a cullet chute at a time when, according to the predetermined sequence, delivery would normally be to a particular section. Thus, when it is anticipated that a section will be inoperative for only a short time so that alteration of the predetermined sequence is not worthwhile, gobs which would otherwise have been delivered to the inoperative section can be disposed of into the cullet chute. If desired, an interceptor can also be used for extra safety. The cullet chute may be located between the gob-delivering guides of two central sections of the machine, i.e. between sections 4 and 5 of an eight section machine. Conveniently, the control means is arranged to select the most appropriate of a plurality of cullet chutes, the selection depending on the deliveries required before and after the alignment with the cullet chute.

Conveniently, the gob distributor may be mounted on a column for pivoting movement between an operative position thereof and an inoperative position thereof, the column having fluid supply pipes extending therethrough through which fluid under pressure flows to and from the motor. The pipes are, thus, protected from the hostile environment around the gob distributor. Pipes for cooling fluid may also pass through the column.

BRIEF DESCRIPTION OF THE DRAWINGS

There now follows a detailed description, to be read with reference to the accompanying drawings, of a gob distributor which is illustrative of the invention. It is to be understood that the illustrative gob distributor has been selected for description by way of example and not of limitation of the invention.

In the drawings.

DETAILED DESCRIPTION OF PREFERRED EMBODIMENT OF THE INVENTION

Figure 1:
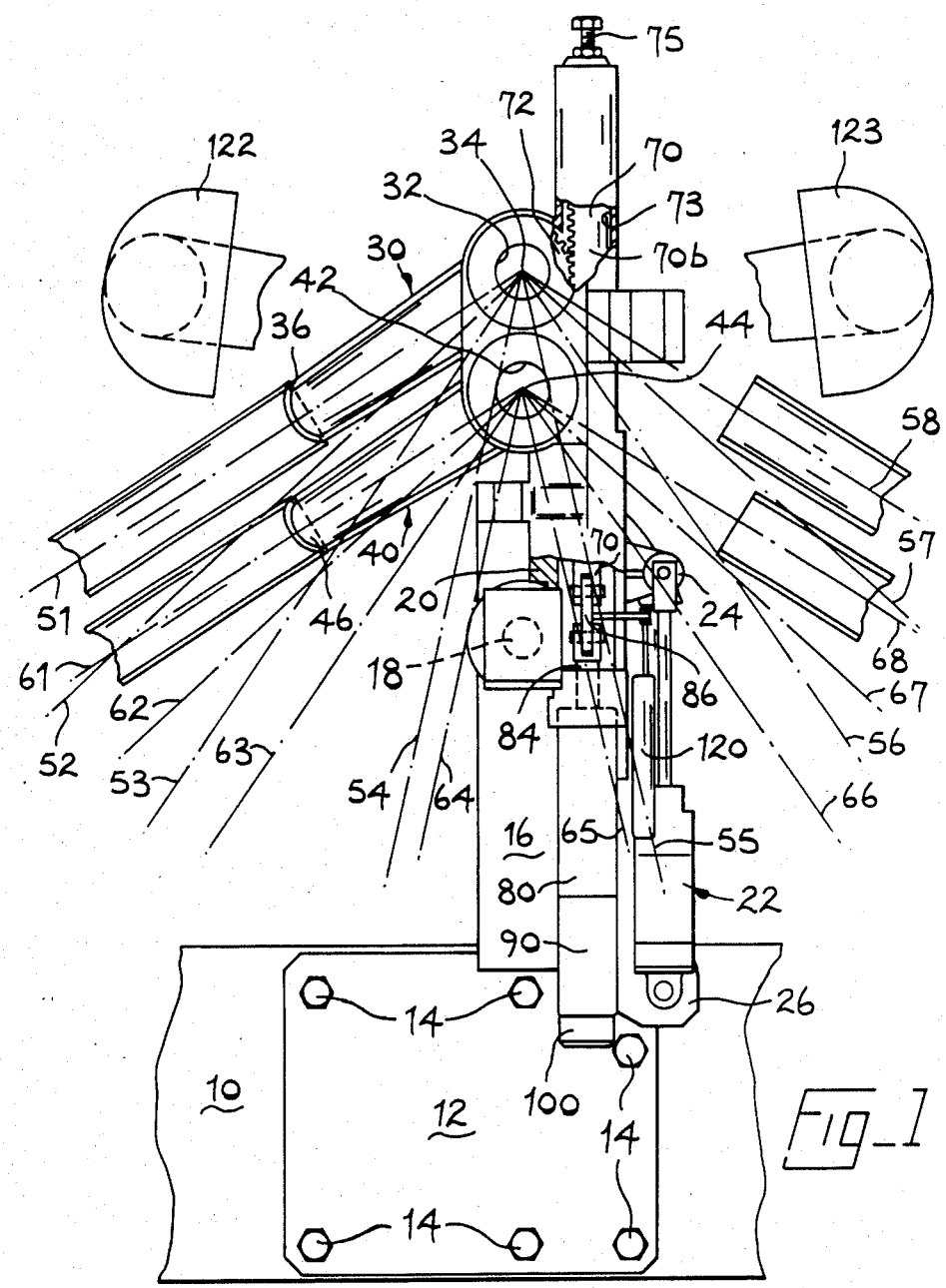
FIG. 1 is a plan view, with parts broken away to show the construction, of the illustrative gob distributor showing it in position on a glassware manufacturing machine of the individual section type.

The illustrative gob distributor is for a glassware manufacturing machine of the individual section type and is operable to deliver gobs of molten glass, supplied by a feeder (not shown), to the sections of the machine (not shown) in a predetermined sequence. The illustrative gob distributor is operable to deliver two gobs at a time to a section but modifications of the illustrative distributor having a different number of scoops can be used to deliver a different number of gobs at a time. The illustrative gob distributor is illustrated and described in relation to a machine having eight sections but can readily be adapted to operate with a machine having more or less sections.

The illustrative gob distributor is supported by a beam 10 of the machine which extends transversely of the machine above the sections thereof. A plate 12 is bolted on top of the beam 10 by bolts 14. A bracket 16 projects from plate 12 normally of the beam 10. A cylindrical column 18 projects upwardly from the bracket 16 and the illustrative gob distributor is pivotally supported on this column 18.

The illustrative gob distributor comprises a housing 20 which is pivotally mounted on the column 18 and serves to support the remaining parts of the distributor.

The housing 20 is pivotal about the column 18 by the action of a piston and cylinder assembly 22 which acts between a bracket 24 on the housing 20 and a bracket 26 mounted on the plate 12. The assembly 22 is operable to pivot the distributor between an operative position thereof (shown in FIG. 1) in which the distributor can distribute gobs and an inoperative position (reached by a clockwise turn through an angle about the column 18, viewing FIG. 1) in which maintenance can be carried out on the distributor.

The distributor comprises a gob-delivering scoop 30 having an upper cylindrical portion 32 arranged to receive gobs falling from the feeder along a vertical axis 34. The scoop 30 is turnable about the vertical axis 34, which extends centrally through the upper end portion 32 thereof, to align a lower curved trough-like portion 36 of the scoop with gob-delivery guides of the sections. A further scoop 40 has an upper end portion 42 and is turnable about a vertical axis 44 to align a lower end portion 46 of the scoop with other gob-delivering guides of the sections so that gobs falling from the feeder along the vertical axis 44 can be delivered.

Figure 5:
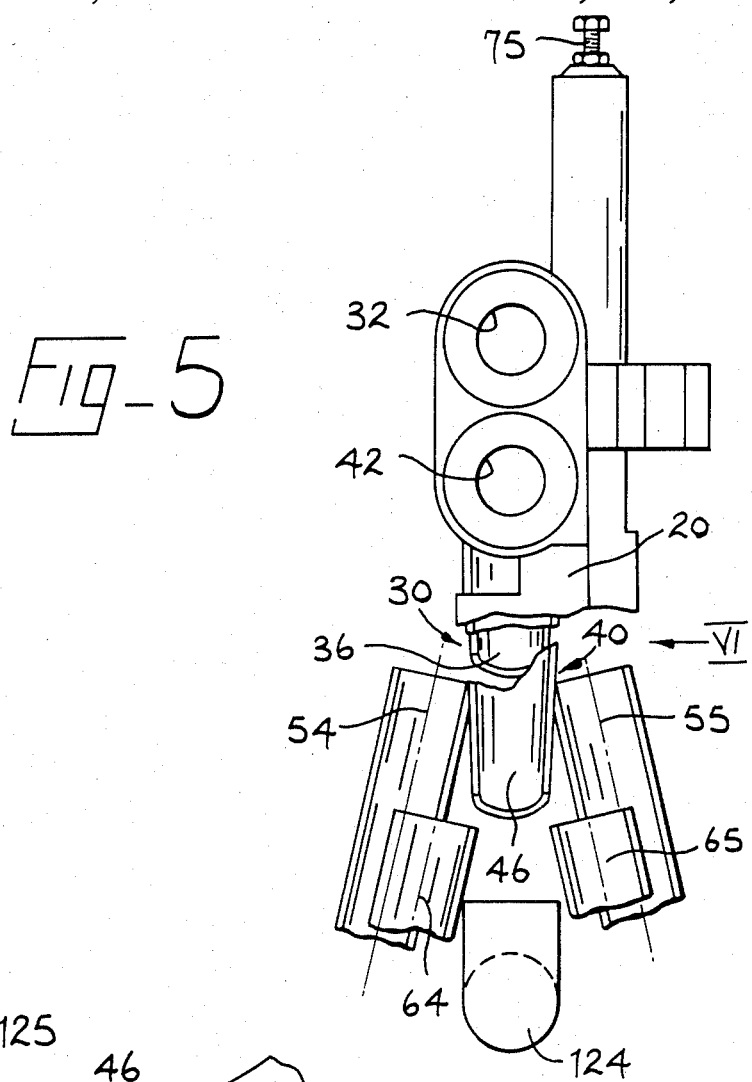
FIG. 5 is a view similar to FIG. 1 but showing parts of the illustrative gob distributor broken away to show the position of a cullet chute.

There are two gob-delivering guides associated with each of the eight sections of the machine, one having an upper end portion arranged so that the lower end portion 36 of the scoop 30 can be aligned therewith and the other having an upper end portion arranged so that the lower end portion 46 of the scoop 40 can be aligned therewith. In the interests of clarity, only the upper end portions of the gob-delivering guides of sections 1 and 8 are shown in FIG. 1 and only upper end positions of the gob-delivering guides of sections 4 and 5 are shown in FIG. 5. However, the centre-lines of the gob-delivering guides associated with the scoop 30 are indicated by the lines 51 to 58, while those of the guides associated with the scoop 40 are indicated by the lines 61 to 68, guides 51 and 61 being associated with section 1, guides 52 and 62 being associated with section 2, and so on. Each gob-delivering guide acts to guide gobs received thereby to a mould of the section with which it is associated.

The illustrative gob distributor also comprises moving means operable to turn the scoop 30 about its vertical axis 34 and also to turn the scoop 40 about its vertical axis 44 to align the lower end portions 36 and 46 of the scoops with the gob-delivering guides. The moving means comprises a toothed rack 70 mounted for longitudinal movement on the housing 20. The rack 70 is meshed with two ring-shaped gears of the moving means. A first of the ring-shaped gears 72 is mounted on the housing 20 to turn about the vertical axis 34 and the scoop 30 passes through the gear 72 and is mounted on the gear 72 to turn therewith. A second of the ring-shaped gears (not shown) is mounted on the housing 20 to turn about the vertical axis 44 and the scoop 40 is mounted thereon in similar fashion to the mounting of the scoop 30 on the gear 72. When the rack 70 is moved longitudinally thereof, both the gears are turned and hence so are the scoops 30 and 40. The scoop 40 is turned through a smaller arc than the scoop 30; this is achieved by providing more teeth on its gear than on the gear 72.

Figure 8:
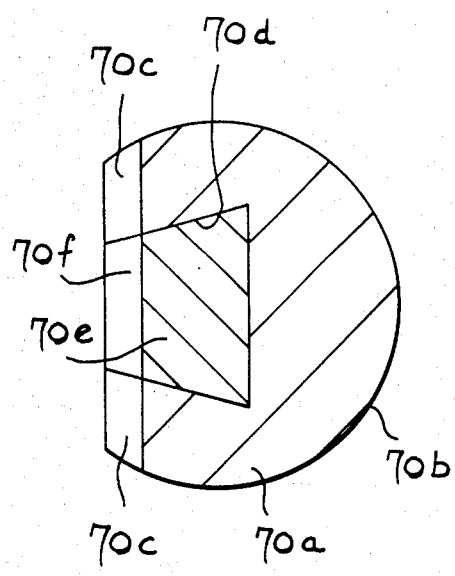
FIG. 8 is a cross-sectional view taken on the line VIII—VIII in FIG. 7.
Figure 7:
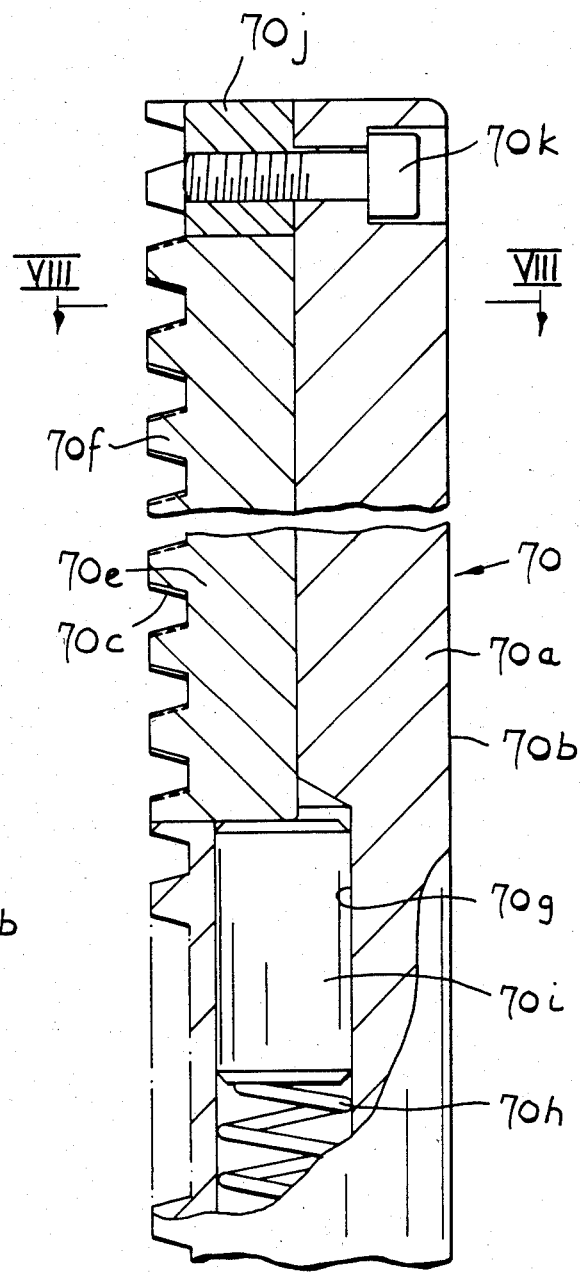
FIG. 7 is a view of a rack of the illustrative gob distributor, on a larger scale than FIGS. 1 to 6.

The rack 70 is shown in greater detail in FIGS. 7 and 8. The rack 70 comprises a carrier portion 70a which has a partially-cylindrical surface 70b arranged to slide along a complementarily-shaped guiding surface 73 of the housing 20. The portion 70a has teeth 70c formed on a flat surface thereof. A wedge-shaped groove 70d is cut into the portion 70a and extends longitudinally thereof. The groove 70d opens through the surface on which the teeth 70c are formed and narrows towards its opening (see FIG. 8). A backlash-absorbing portion 70e is slideable-longitudinally in the groove 70d. The portion 70e is generally wedge-shaped and of complementary-shape to the groove 70d, so that it cannot move out of the groove 70d, and has teeth 70f of identical size and spacing to the teeth 70c formed thereon between the teeth 70c. Thus, when the portion 70e is suitably positioned along the groove 70d, the teeth 70c and 70f form a continuous toothed surface. At one end of the groove 70d, the portion 70a defines a recess 70g in which a spring 70h is contained which acts on a cylindrical member 70i also contained in the recess 70g. The member 70i bears on an end of the backlash-absorbing portion 70e so that the spring 70h urges the portion 70e towards a stop 70j mounted on the portion 70a by means of a bolt 70k and arranged to engage the opposite end of the portion 70e. Thus, the teeth of the rack 70 are formed partially on the carrier portion 70a thereof which is, as described below, rigidly fixed to a fluid pressure-operated motor and partially on the backlash-absorbing portion 70e which is movable longitudinally of the portion 70a against the action of the spring 70h. In the use of the rack 70, the spring 70h acts to maintain the teeth 70f in engagement with the teeth of the gears meshed with the rack 70 so that the backlash between the teeth is absorbed, FIG. 7 shows a small displacement of the teeth 70f relative to the teeth 70c such as might occur in use. A stop screw 75 mounted on the housing 20 (see FIGS. 1 and 5) limits the movement of the rack 70 away from the beam 10.

Figure 2:
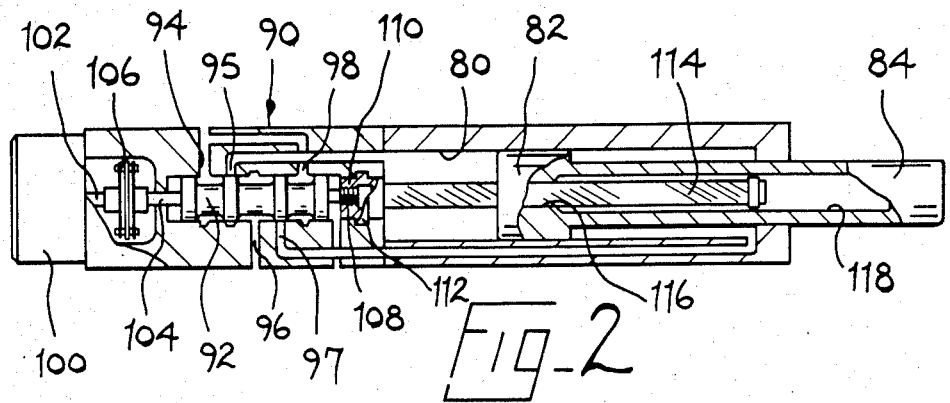
FIGS. 2 to 4 are cross-sectional views taken through moving means and control means of the illustrative gob distributor, FIG. 2 showing the moving means in a state of rest, FIG. 3 showing the moving means operating to cause movement in one direction, and FIG. 4 showing the moving means operating to cause movement in the opposite direction.
Figure 3:
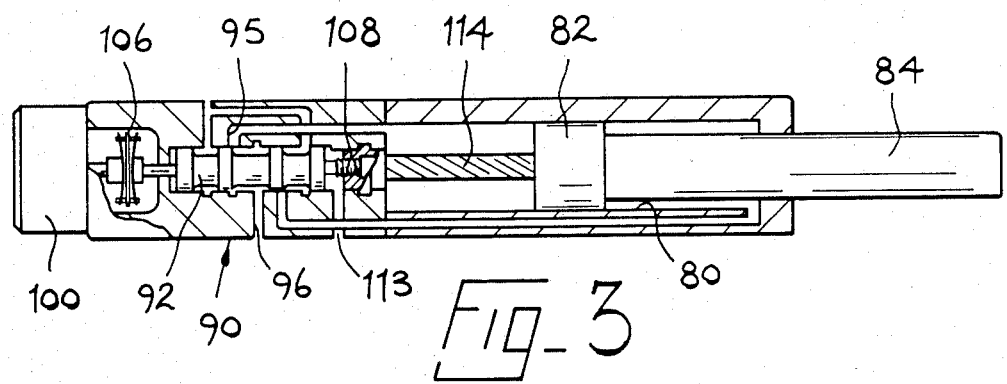
Figure 4:
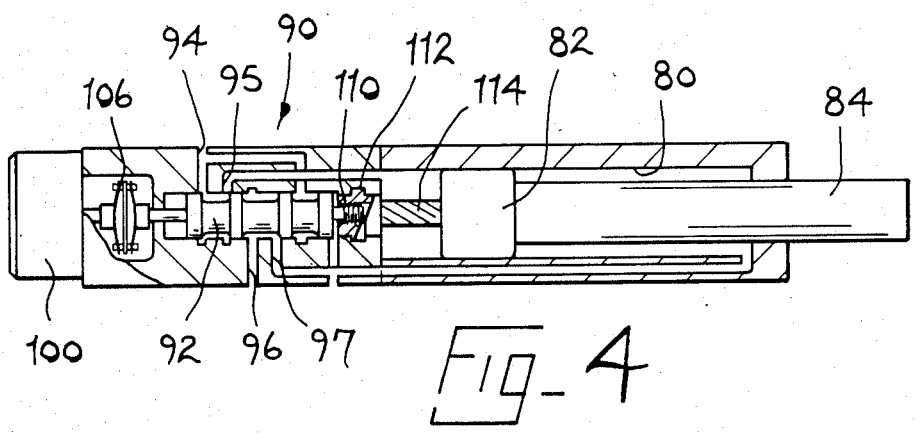

The moving means of the illustrative gob distributor also comprises a fluid pressure-operated motor coupled to the rack 70 and, hence, to the scoops 30 and 40 so that operation of the motor moves the rack 70 and turns the scoops about their respective vertical axes. The fluid pressure-operated motor is provided by a hydraulic piston and cylinder assembly comprising a cylinder 80 mounted on the housing 20 (see also FIGS. 2 to 4), a piston 82 movable along the cylinder on the introduction of hydraulic fluid under pressure into the cylinder 80, and a piston rod 84 projecting from and movable with the piston 82. The piston rod 84 extends beyond the cylinder 80 and is rigidly coupled by a link 86 to the portion 70a of the rack 70 (the link 86 and rack 70 have been omitted from FIGS. 2 to 4).

The illustrative gob distributor also comprises control means operable to control the moving means so that the lower end portions 36 and 46 of the scoops 30 and 40 are moved into alignment with the gob-delivering guides of the sections in a predetermined sequence in timed relationship to the receipt of gobs by the upper end portions 32 and 42 of the scoops 30 and 40 so that the gobs are delivered to the sections in the predetermined sequence.

The control means comprises a valve 90 mounted on the cylinder 80 and operable to control the supply of fluid under pressure to the piston and cylinder assembly 80,82. The valve 90 has five ports and a spool 92 which is movable longitudinally to control the flow of hydraulic fluid through the ports. A first 94 of the ports is connected to a tank (not shown) via a pipe (not shown) which passes through the column 18, a second 95 of the ports is connected to the interior of the cylinder 80 to the left (viewing FIGS. 2 to 4) of the piston 82, a third 96 of the ports is connected to a source of hydraulic fluid under pressure provided by a pump (not shown) via a pipe (not shown) which passes through the column 18, a fourth of the ports 97 is connected to the interior of the cylinder 80 to the right (viewing FIGS. 2 to 4) of the piston 82, and a fifth 98 is connected to the first port 94 and hence to the tank. The spool 92 has a rest position (shown in FIG. 2) in which it shuts off the ports 94 and 97 and hence the supply of fluid under pressure to the cylinder 80 so that the piston 82 does not move and the scoops 30 and 40 are not turned. The spool 92 is displaceable longitudinally thereof from its rest position in one direction (to the left viewing FIGS. 2 to 4) to supply fluid to the cylinder 80 to cause the piston and cylinder assembly to turn the scoops 30 and 40 anti-clockwise. The spool 92 is shown in this displaced condition in FIG. 3, and in this condition, the port 96 communicates with the port 95 so that fluid enters the cylinder 80 to the left of the piston 82. This causes the piston 82 to move to the right moving the piston rod 84 and the rack 70. This movement of the rack 70 turns the gears and the scoops 30 and 40 anti-clockwise. The port 97 communicates with the port 98 so that fluid can exhaust from the cylinder 80 from the right of the piston 82 to the tank. The spool 92 is also displaceable in the opposite direction from its rest position (to the right viewing FIGS. 2 to 4) to supply fluid to the cylinder 80 to cause the piston and cylinder assembly 80,82 to turn the scoops 30 and 40 clockwise. The spool 92 is shown in this second displaced condition in FIG. 4 and, in this condition, the port 96 communicates with port the 97 so that fluid enters the cylinder 80 to the right of the piston 82. This causes the piston 82 to move to the left moving the piston rod 84 and the rack 70. This movement of the rack 70 turns the gears and the scoops 30 and 40 clockwise. The port 95 communicates with the port 94 so that fluid can exhaust from the cylinder 80 from the left of the piston 82 to the tank.

The control means of the illustrative gob distributor also comprises a servo-motor operable to operate the valve 90 so that the piston and cylinder assembly 80,82 turns the scoops 30 and 40 into the required alignments. The servo-motor is an electrical stepper motor 100 mounted on the valve 90 and coupled to the spool 92 so that operation of the motor 100 is effective to displace the spool 92. The motor 100 has an output shaft 102 which is coupled to a shaft 104 by a resilient coupling 106 which allows the shaft 104 to move relative to the motor 100. The motor 100 is, thus, operable to turn the shaft 104. The shaft 104 is connected to the spool 92 so that turning the shaft 104 causes longitudinal displacing movement of the spool 92. The shaft 104 passes through the spool 92 and has a screw-threaded portion 108 which forms a screw-threaded connection with a threaded bush 110. The bush 110 is held against longitudinal movement by a flange 112 thereof which is turnably-received in a recess. The connection is such that turning the shaft 104 causes the portion 108 to move into or out of the bush 110 so that longitudinal movement of the shaft 110 and of the spool 92 is caused. The space between the spool 92 and the bush 110 is vented through a port 113.

The piston and cylinder assembly 80,82 is coupled to the spool 92 so that operation of the assembly causes the spool to be returned to its rest position. This coupling is by a screw-threaded connection between the piston 82 and a threaded spindle 114 which extends within the cylinder 80 longitudinally thereof. The spindle 114 is externally threaded, and passes through a threaded passage 116 in the piston 80 making a threaded connection therewith, and enters a recess 118 in the piston rod 84. The spindle 114 is integral with the bush 110 and is hence held against longitudinal movement. At the piston 82 cannot turn because of the coupling between the piston rod 84 and the rack 70, movement of the piston 82 causes the spindle 114 to turn. As the spindle 114 is integral with the bush 110 and hence is mounted to turn therewith when the spindle 114 turns so does the bush 110 and this moves the shaft 104 because of its screw-threaded connection with the bush 110. The arrangement of the screw threads is such that movement of the piston 82 to the right causes the shaft 104 to be moved to the right. As movement of the shaft 104 causes movement of the spool 92, the spindle 114 is connected to the spool 92 so that turning the spindle causes movement of the spool, movement of the piston 82 to the left causes movement of the shaft 104 and spool 92 to the left. The spool 92 is moved towards its rest position in either movement of the piston 82.

In order to turn the scoops 30 and 40 anti-clockwise through the required angle to bring the scoops into alignment with gob-delivering guides of a particular section, an appropriate number of electrical pulses are supplied to the motor 100, the number of pulses being greater the greater that the angle is. This causes the motor 100 to turn the shaft 104 through a specific angle thereby moving the shaft 104 and compressing the coupling 106. This movement of the shaft 104 moves the spool 92 and causes fluid to enter the cylinder 80 to the left of the piston 82. The movement of the piston 82 moves the rack 70 and turns the scoops 30 and 40. The spindle 114 is also turned so that the spool 92 is returned to its rest position which it will reach after the motor 100 has ceased operation. When the spool 92 reaches its rest position, the piston 82 stops as its supply of fluid is cut off and the scoops 30 and 40 come to rest. The number of pulses supplied to the motor 100 controls precisely the movement of the piston 82 and hence of the rack 70. To turn the scoops 30 and 40 clockwise, the direction of the motor 100 is reversed to move the spool 92 to the right, expanding the coupling 106 so that the piston 82 moves to the left.

The illustrative gob distributor can be rapidly re-programmed merely by altering the number of pulses supplied to the motor 100 for each movement thereof. As the motor 100 is only moving the shaft 104 and the spool 92, it does not need to be a heavy-duty motor.

Figure 6:
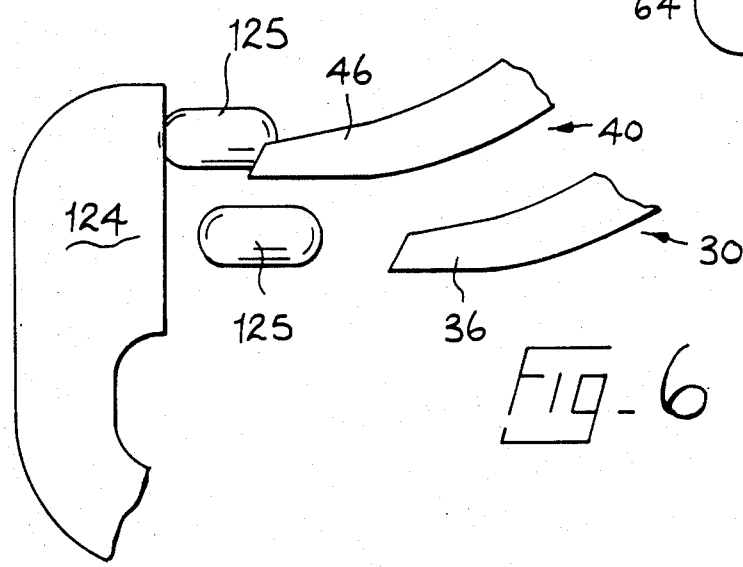
FIG. 6 is a view taken in the direction of the arrow VI in FIG. 5.

The illustrative gob distributor also comprises a position feedback device provided by a linear variable differential transformer 120 mounted on the cylinder 80 and having its moving element attached to the coupling 86. The transformer 120 acts to monitor the movements caused by operation of the assembly 80,82 by monitoring the movements of the piston rod 84 so that emergency action can be taken in the event that the movements are not as expected. A computer (not shown) stores the predetermined sequence of the sections, provides pulses to the motor in synchronisation with timing signals received from the feeder, and compares the output of the transformer 120 with that expected. The computer is also programmable to align the scoops 30 and 40 with any of three cullet chutes 122,123 and 124, two (122 and 123) being visible in FIG. 1 and being located beyond the guides 51 and 58 respectively in the region not normally traversed by the scoops 30 and 40 and another 124 (see FIGS. 5 and 6 but not visible in FIG. 1) located between the guides 64 and 65 of the two central sections 4 and 5 beneath the bracket 16. Each chute 122,123 and 124 is arranged to catch gobs 125 leaving the lower ends 36 and 46 of the scoops 30 and 40. The scoops 30 and 40 are aligned with a cullet chute at a time when, according to the predetermined sequence, delivery would normally be to a particular section in response to the lack of a signal indicating that the particular section is operative. The computer is arranged to select the most appropriate of the cullet chutes to enable the preceding and subsequent required movements to be efficiently made. Thus, the danger of gobs arriving at the inoperative section is avoided.

We claim:

1. For use with gob distributor for a glassware manufacturing machine of the individual section type operable to deliver gobs of molten glass to the sections of the machine in a predetermined sequence, the distributor comprising a gob delivering scoop, the scoop having an upper end portion arranged to receive gobs, and being turnable about a vertical axis extending through the upper end portion thereof to align a lower end portion of the scoop with gob-delivering guides of the sections, a moving assembly operable to turn the scoop about its vertical axis to align its lower end portion with the gob-delivering guides, and a control assembly operable to control the moving means so that the lower end portion of the scoop is moved into alignment with the gob-delivering guides of the sections in the predetermined sequence in timed relationship to the receipt of gobs by the upper end portion of the scoop so that gobs are delivered to the sections in the predetermined sequence; improved moving and control assemblies comprising:

a liquid pressure-operated motor comprising a piston and cylinder assembly having a piston rod coupled to the scoop so that the movement of the piston rod turns the scoop about said vertical axis, and a valve which controls the supply of liquid under pressure to move the piston in one of two directions and thereby move the scoop clockwise or anti-clockwise, said valve including a spool having a rest position in which it prevents the supply of liquid to either side of the piston, said spool being displaceable in first and second directions to cause the valve to supply liquid under pressure to move said piston in one of said two directions;

a servo-motor for turning a shaft, said shaft being coupled to said spool by a rotary-to-linear linkage so that the rotation of the shaft in one of two senses causes the displacement of the spool in a respective one of the first and second directions, said piston being coupled to said spool so that motion of the piston in one of the first and second directions urges the spool toward its rest position.

2. A gob distributor according to claim 1, wherein the piston has a screw-threaded connection with a spindle extending within the cylinder such that movement of the piston causes the spindle to turn, the spindle being connected to the spool so that turning the spindle causes movement of the spool.

3. A gob distributor according to claim 2, wherein the servo-motor is operable to turn a shaft which is connected to the spool so that turning the shaft causes movement of the spool, the shaft having a screw-threaded connection with a bush which is held against longitudinal movement so that turning the shaft causes longitudinal movement thereof and of the spool, the bush being mounted to turn with the spindle to move the shaft and, therefore, to move the spool towards its rest position.

4. A gob distributor according to claim 3, wherein the servo-motor is coupled to the shaft by a resilient coupling which allows the shaft to move relative to the servo-motor.

5. A gob distributor according to claim 1, wherein the fluid pressure-operated motor is operable to move a toothed rack longitudinally thereof, the rack being meshed with a ring-shaped gear through which the scoop passes, the gear being mounted to turn about the vertical axis of the scoop and the scoop being mounted on the gear to turn therewith, and wherein the teeth of the rack are formed partially on a carrier portion thereof which is rigidly fixed to the liquid pressure-operated motor and partially on a backlash-absorbing portion which is movable longitudinally of the carrier portion against the action of a spring.

6. A gob distributor according to claim 1, wherein a position feedback device monitors the movements caused by operation of the liquid pressure-operated motor so that emergency action can be taken in the event that the movements are not as expected.

7. A gob distributor according to claim 1, wherein the control means is programmable to align the scoop with a cullet chute at a time when, according to the predetermined sequence, delivery would normally be to a particular section.

8. A gob distributor according to claim 8, wherein the control means is arranged to select the most appropriate of a plurality of cullet chutes.

9. A gob distributor according to claim 1, wherein the gob distributor is mounted on a column for pivoting movement between an operative position thereof and an inoperative position thereof, the column having liquid supply pipes extending therethrough through which liquid under pressure flows to and from the motor.

* * * * *